3,044,864
DISTILLATE FUELS INHIBITED AGAINST BACTERIAL GROWTH

James W. Ryder, Berkeley Heights, N.J., assignor to Esso Research and Engineering Company, a corporation of Delaware
No Drawing. Filed Apr. 6, 1959, Ser. No. 804,132
20 Claims. (Cl. 44—63)

The present invention relates to improved petroleum distillate fuels and more particularly relates to gasolines, jet engine fuels, kerosines, diesel fuels and similar distillate fuel products boiling in the range between about 75° F. and about 750° F. which have been inhibited against the formation of sludge and sediment due to the growth of bacteria and fungi when such products are stored in contact with water. In a preferred embodiment, the invention relates to aviation turbo-jet fuels having incorporated therein small amounts of certain nitro-alcohols and certain N-thiotrichloromethyl organic compounds which in combination are singularly effective for preventing organic growth at fuel-water interfaces.

Aviation turbo-jet fuels are frequently stored and transported in tanks containing an aqueous phase resulting from the condensation of atmospheric moisture, salt water spray on aircraft carriers and land tanks near the shore, salt water ballast in tankers, seepage, treating water carryover and the like. Conditions at the interface between the aqueous phase and the fuel in such tanks are ideal for the growth of bacteria and fungi. One result of such organic growth is the formation of sludge and sediment which are insoluble in both the fuel and water. When the fuel is subsequently withdrawn from such a tank, this sludge and sediment becomes entrained in the fuel and may cause fouling of the filter-separator unit through which the fuel is normally passed before it is introduced into the tanks of the aircraft in which it is to be used. In some cases, fouling of the aircraft fuel system and engines themselves may occur due to the sludge and sediment, resulting in malfunctioning of the engine during operation. Similar difficulties are frequently encountered with gasolines, kerosines, diesel fuels and other petroleum distillate fuel products boiling in the range between about 75° F. and about 750° F.

The present invention provides a singularly effective method for preventing the formation of sludge and sediment due to organic growth when petroleum distillate fuel products boiling between about 75° F. and about 750° F. are stored in contact with water. In accordance with the invention, it has now been found that combinations of certain aliphatic nitro-alcohols and N-thiotrichloromethyl derivatives of certain organic compounds inhibit the growth of micro organisms in tanks containing distillate fuel products and water despite the fact that the individual constituents of such combinations are not toxic to bacteria in this particular system. The combination inhibitor is effective in distillate fuel products at low concentrations such that it has no adverse effect upon fuel quality and is attractive for preventing organic growth at fuel-water interfaces under a wide variety of conditions.

The nitro-alcohols employed as one constituent of the combination inhibitor of the invention are compounds in which the nitro group and a methylol group are attached to the same carbon atom. Such compounds have the following formula

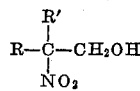

where R and R' each designate an alkyl or aryl group which may be substituted. R and R' are not necessarily the same. Generally R and R' will be hydrogen atoms, methyl groups, ethyl groups, or hydroxymethyl groups. A preferred class of these compounds consists of low molecular weight nitro-alcohols such as 2-nitro-propanol-1, 2-nitro-1,3-propanediol, 2-nitro-2-methyl-1,3-propanediol, 2-nitro-2-ethyl-1,3-propanediol, 2-nitro-2-hydroxymethyl-1,3-propanediol and 2-nitro-butanol-1. Of these compounds, the nitro-propanediols, particularly 2-nitro-2-hydroxymethyl-1,3-propanediol, have been found to be especially effective for purposes of the invention and are therefore particularly preferred.

The compounds useful as the second constituent of the combination inhibitor of the invention are compounds containing the >NSCCl₃ group in which the nitrogen is linked to two carbon atoms neither of which is part of an acyl group; two acyl groups; or one acyl group and one carbon atom not part of an acyl group. The phrase acyl group refers to groups of the following character

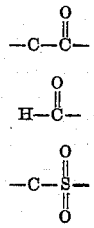

etc. (See Hackh's "Chemical Dictionary," third edition, page 18.) When the nitrogen atom of the >NSCCl₃ is linked to one acyl group, the compounds may be regarded as amide derivatives, i.e., N-thiotrichloromethyl amides (or N-trichloromethylthio amides). When both of the free linkages of the >NSCCl₃ group are taken up by acyl groups, the compounds may be regarded as N-thiotrichloromethyl imides (or N-trichloromethylthio imides). (See Sidgwick's "Organic Chemistry of Nitrogen," 1937 edition, pages 136 and 152.)

Suitable amide compounds of the indicated type are thus illustrated in Formula I:

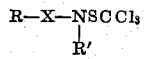

FORMULA I in which R represents an organic residue, X is part of an acyl group, such as for example

and

and R' represents an organic radical or a hydrogen atom. N-thiotrichloromethyl benzene sulfonamides wherein R' represents an alkyl group of from 2 to 12 carbon atoms, N-thiotrichloromethyl N-butyl benzene sulfonamide for example, or an aromatic radical, as in the case of N-thiotrichloromethyl N-phenyl benzene sulfonamide, are preferred amides.

Suitable imide compounds of the indicated type are illustrated by Formula II:

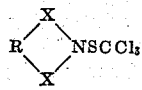

FORMULA II in which R represents one or more organic residues and X is part of an acyl group, such as for example

and

The organic residue may be aliphatic, aromaitc, alicyclic, heterocyclic, and their substituted derivatives. Imides having the above formula wherein R is a carbocyclic or substituted carbocyclic radical and X is a carbonyl group are especially effective.

The N-trichloromethyl amides and imides which may thus be employed in accordance with the invention are in general prepared by the reaction of perchloromethyl mercaptan with the corresponding amide or imide or a metal salt of the amide or imide. Such reactions can be represented by the following equation:

$$>N-M + ClSCCl_3 \rightarrow >N-SCCl_3 + MCl$$

in which M represents hydrogen or a metal and the nitrogen atom is attached to an organic residue.

Specific examples of N-thiotrichloromethyl compounds which may be formed in this manner and which are suitable for purposes of the invention include N-thiotrichloromethyl tetrahydrophthalimide, N-thiotrichloromethyl-N-butyl benzenesulfonamide, N-trichloromethyl-N-phenylbenzene sulfonamide, N-thiotrichloromethyl-2,4-dioxothiazolidine, N-thiotrichloromethyl-5,5-dimethyl-oxazolidene-2,4-dione, N-thiotrichloromethyl-5,5-dimethyl-hydantoin, N-thiotrichloromethyl morpholine, N-thiotrichloromethyl-o-sulfo benzimide. The N-thiotrichloromethyl imides such as N-thiotrichloromethyl tetrahydrophthalimide, N-thiotrichloromethyl phthalimide, N-thiotrichloromethyl succinimide, N-thiotrichloromethyl endomethylenetetrahydrophthalimide, chlorinated N-thiotrichloromethyl tetrahydrophthalimide, N-thiotrichloromethyl o-benzoic sulfimide and N-thiotrichloromethyl $C_9$ alkenyl succinimide are preferred for purposes of the invention. N-thiotrichloromethyl tetrahydrophthalimide is particularly preferred.

The constituents which thus make up the combination inhibitor of the invention may be employed by adding them directly to a petroleum distillate fuel boiling in the range between about 75° F. and about 750° F., by adding them to the aqueous phase in tanks in which such fuels are to be stored or transported, or by adding them separately to the fuel and aqueous phases. The nitro-alcohols employed are highly soluble in water and are less soluble in distillate fuels. The N-thiotrichloromethyl derivatives, on the other hand, are generally somewhat soluble in distillate fuels and less soluble in water. This difference in solubility will frequently make it advantageous to separately incorporate the N-thiotrichloromethyl derivatives in a petroleum distillate fuel at the refinery and to add the nitro-alcohol to the aqueous phase present in tanks in which the fuel is to be stored and transported between the time it is produced and the time it is used. It will be understood, however, that both constituents of the inhibitor combination are sufficiently soluble in jet fuel and similar distillate fuel products that they may be employed in combination as a fuel additive.

In general it is preferred to employ the N-thiotrichloromethyl amides and imides in concentrations of about 1 to about 50 parts per million, based on the weight of the fuel. Concentrations of the order of from 5 to 25 parts per million are generally highly effective and will normally be preferred. The nitro-alcohols are employed in concentrations of from about 5 to about 100 times the concentrations in which the N-thiotrichloromethyl amides and imides are used. Concentrations of from about 10 to 40 times the concentrations in which the N-thiotrichloromethyl amides and imides are used are generally preferred. When the nitro-alcohols are separately added to the aqueous phase in a tank or similar vessel, they may be added in concentrations of from about 50 to about 1000 parts per million, based on the weight of the water, and will preferably be used in concentrations between about 100 and about 750 parts per million.

The petroleum distillate fuels in conjunction with which the combination inhibitor of the invention is employed are those boiling in the range between about 75 and about 750° F. and include gasolines, kerosines, aviation turbo-jet fuels, diesel fuels and the like. As pointed out heretofore, the inhibitor combination is particularly beneficial when used in conjunction with aviation turbo-jet fuels such as those dsecribed in U.S. Military Specifications MIL-F-5616, MIL-F-5624D, MIL-F-25558A and MIL-F-25524A. The properties of such petroleum distillate fuels are generally well known to those skilled in the art and need not be set forth in detail to permit an understanding of the present invention.

The effectiveness of the combination inhibitor of the invention for preventing bacterial growth in distillate fuels stored in contact with an aqueous phase can readily be seen by considering the results of tests in which bacteria were added to samples of a sterile fuel and sterile water containing nutritive salts, with and without various inhibitors. The fuel employed in these tests was a commercial turbo-jet aviation fuel of the kerosine type having the following inspections:

| | |
|---|---|
| Gravity, ° API | 43.9 |
| Viscosity, centistokes at 0° F | 5.10 |
| Freezing point, ° F | −53 |
| ASTM distillation: | |
|     Initial boiling point, ° F | 306 |
|     10% point, ° F | 345 |
|     50% point, ° F | 410 |
|     90% point, ° F | 492 |
|     Final boiling point, ° F | 516 |
| Smoke point, mm | 25 |
| Olefins, vol. percent | 1.4 |
| Aromatics, vol. percent | 9.4 |
| Sulfur, wt. percent | 0.06 |
| Heat content, B.t.u./# | 18,685 |

Samples of this fuel were rendered sterile by heating in a steam autoclave at 15 p.s.i.g. for 20 minutes. To each of the sterile fuel samples was added sterile water containing Bushnell-Haas nutritive salts.

The fuel-water samples prepared as described above were inoculated with a mixture of 12 strains of bacteria which had been isolated and recultured from fuel-water interface bacterial growths collected from tanks used to store turbo-jet fuels at a number of different military installations. The 12 strains of bacteria employed were considered representative of those found in petroleum distillate fuel-water systems of this type. Fungi, not included in the test fuel, are much easier to kill than bacteria and are generally susceptible to bactericides which are effective in distillate fuel-water systems. The fuel-water samples, after inoculation, were incubated at 85° F. for a period of 5 days and then examined to determine whether bacterial growth had occurred by comparing them with blank samples. In those cases where no bacterial growth was apparent, a portion of the interfacial liquid was withdrawn from the sample and recultured on Difco nutrient agar. These recultured specimens were then re-examined after a 5 day period in order to determine whether the bacteria originally present in the fuel-water samples had been killed by the inhibitor employed or had merely remained dormant. The combination inhibitor of the invention, the individual constituents of the combination inhibitor, and materials employed commercially as bactericides were employed in testing the fuel-water samples in the manner described above. The results of these tests are set forth in the following table:

*Effect of Additives Upon Bacterial Growth in Jet Fuels*

| Additive | Additive Concentration | Effect Upon Bacteria |
| --- | --- | --- |
| 2 - Nitro - 2 - Hydroxymethyl - 1,3 - Propanediol. | 500 p.p.m. in Water. | Not Bactericidal. |
| N - Thiotrichloromethyl Tetrahydrophthalimide. | 10 p.p.m. in Fuel. | Do. |
| Sodium Tetraborate | 5 Wt. percent in Water. | Do. |
| Commercial Bactericide A [1] | 20 p.p.m. in Water. | Do. |
| Commercial Bactericide B [1] | 0.1 Wt. percent in Water. | Do. |
| Commercial Bactericide C [1] | 0.15 Wt. percent in Water. | Do. |
| 2 - Nitro - 2 - Hydroxymethyl - 1,3 - Propanediol. | 500 p.p.m. in Water. | Bactericidal. |
| N - Thiotrichloromethyl - Tetrahydrophthalimide. | 10 p.p.m. in Fuel. | |

[1] The Commercial Bactericides employed were as follows:
Commercial Bactericide A—Unknown composition
Commercial Bactericide B—Sodium salts of dimethyl dithiocarbamic acid and 2-mercaptobenzothiazole
Commercial Bactericide C—Sodium salt of ortho phenylphenol.

The concentrations in which these commercial bactericides were employed were equal to or higher than the concentrations recommended by the manufacturers.

From the data set forth in the above table, it can be seen that the combination inhibitor of the invention was singularly effective for preventing the growth of bacteria at the fuel-water interfaces. The samples to which had been added the combination inhibitor remained clean and clear over the entire 5 day incubation period. Reculturing of a sample withdrawn from the interface showed a complete absence of bacteria at the end of a second 5 day period. The combination inhibitor was effective despite the fact that neither the individual constituents of the inhibitor nor the materials employed commercially as bactericides killed the bacteria in the fuel-water samples.

Other inhibitor compositions which may be employed in petroleum distillate fuels boiling in the range between about 75° F. and about 750° F. are shown in the following table:

| Composition | NSCCl₃ Compound | Concentration, p.p.m. | Nitro-alcohol | Concentration, p.p.m. |
| --- | --- | --- | --- | --- |
| A | N-thiotrichloromethyl morpholine. | 20 | 2-Nitro-Butanol-1 | 700 |
| B | N-thiotrichloromethylsuccinimide. | 30 | 2-Nitro-2-Methyl-1,3-Propanediol. | 400 |
| C | N-thiotrichloromethyl tetrahydrophthalimide. | 5 | 2-Nitro-1,3-Propanediol. | 500 |
| D | N-thiotrichloromethyl-N-butyl benzenesulfonamide. | 40 | 2-Nitro-Propanol-1 | 200 |
| E | N-thiotrichloromethyl-2,4-dioxothiazolidine. | 25 | 2-Nitro-2-Hydroxymethyl-1,3-Propanediol. | 500 |
| F | N-thiotrichloromethyl-5,5-dimethyl-hydantoin. | 10 | 2-Nitro-2-Ethyl-1,3-Propanediol. | 1000 |
| G | N-thiotrichloromethyl phthalimide. | 8 | 2-Nitro-2-Hydroxymethyl-1,3-Propanediol. | 800 |
| H | N-Thiotrichloromethyl-o-Sulfo Benzimide. | 50 | 2-Nitro-Butanol-1 | 500 |
| I | N-Thiotrichloromethyl Tetrahydrophthalimide. | 25 | 2-Nitro-Propanol-1 | 125 |
| J | N-Thiotrichloromethyl-5,5-Di-methyl-Oxazolidine-2,4-dione. | 15 | 2-Nitro-2-Ethyl-1,3-Propanediol. | 300 |

It will be understood that the inhibitors of the invention may be incorporated into petroleum distillate fuels containing a variety of other additive agents commonly used in such fuels. Such agents include rust and corrosion inhibitors, antioxidants, metal deactivators, dispersants, dyes, dye stabilizers, antistatic additives, combustion promoters, antidetonation agents, scavengers, antiicing agents and the like. In some cases it may be desirable to blend the inhibitors of the invention with other additives in the form of an additive concentrate. These and other modifications of the invention will be obvious to those skilled in the art.

What is claimed is:

1. A method for preventing the growth of bacteria at the water-fuel interface between a petroleum distillate fuel boiling in the range between about 75° F. and about 750° F. and water, which comprises providing in said fuel from about 1 to about 50 parts per million, based upon the weight of the fuel, of a compound selected from the group consisting of a N-thiotrichloromethyl amide (a)

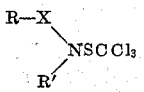

and a N-thiotrichloromethyl imide (b)

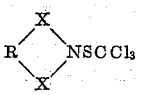

wherein X is an acyl group, R' is selected from the class consisting of alkyl radicals from 2 to 12 carbon atoms, aryl radicals and hydrogen, and R is a carbocyclic radical, and providing in said water from about 50 to about 1000 parts per million, based upon the weight of the water, of a low molecular weight nitro-alcohol having the formula

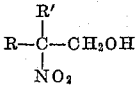

wherein R and R' are selected from the class consisting of aryl radicals, alkyl radicals, hydroxymethyl radicals, and hydrogen.

2. A method as defined by claim 1 wherein the N-thiotrichloromethyl compound employed is an imide.

3. A method as defined by claim 1 wherein said nitro-alcohol is a 2-nitro-1,3-propanediol.

4. A method as defined by claim 1 wherein said imide is N-thiotrichloromethyl tetrahydrophthalimide.

5. A method as defined by claim 1 wherein said nitro-alcohol is 2-nitro-2-hydroxymethyl-1,3-propanediol.

6. A method for preventing the growth of bacteria at the water-fuel interface in a vessel containing a petroleum distillate fuel boiling in the range between about 75° F. and about 750° F. and water which comprises dispersing in said fuel and water a mixture of from about 1 to about 50 parts per million, based upon the weight of the fuel, of N-thiotrichloromethyl tetrahydrophthalimide and from about 50 to about 1000 parts per million, based upon the weight of the water, of 2-nitro-2-hydroxymethyl-1,3-propanediol.

7. A method as defined by claim 6 wherein from 5 to 25 parts per million of said N-thiotrichloromethyl tetrahydrophthalimide and from 100 to 750 p.p.m. of said 2-nitro-2-hydroxy-methyl-1,3-propanediol are dispersed in said fuel and water.

8. A petroleum distillate fuel boiling in the range between about 75° F. and about 750° F. to which has been added from about 1 to about 50 parts per million, based upon the weight of the fuel, of a compound selected from the group consisting of a N - thiotrichloromethyl amide (a)

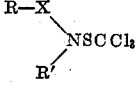

and a N-thiotrichloromethyl imide (b)

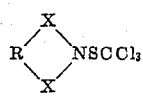

wherein X is an acyl group, R' is selected from the class consisting of alkyl radicals of from 2 to 12 carbon atoms, aryl radicals and hydrogen, and R is a carbocyclic radical, and from about 5 to about 100 times the concentration of said N-thiotrichloromethyl compound of a low molecular weight nitro-alcohol having the formula

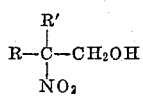

wherein R and R' are selected from the class consisting of aryl radicals, alkyl radicals, hydroxymethyl radicals, and hydrogen.

9. A fuel as defined by claim 8 wherein said N-thiotrichloromethyl compound is N-thiotrichloromethyl tetrahydrophthalimide.

10. A fuel as defined by claim 8 wherein said nitropropanediol is 2-nitro-2-hydroxymethyl-1,3-propanediol.

11. An aviation turbo-jet fuel having incorporated therein from about 5 to about 25 parts per million, based upon the weight of the fuel, of N-thiotrichloromethyl tetrahydrophthalimide and from about 50 to about 1000 parts per million of 2-nitro-2-hydroxymethyl-1,3-propanediol.

12. A method as defined in claim 1, wherein in the said imide compound X is a carbonyl group.

13. A method as defined in claim 1, wherein in the said amide compound X is a sulfonyl group, and R is a phenyl radical.

14. A method as defined in claim 1, wherein said amide is N-thiotrichloromethyl N-butyl benzene sulfonamide.

15. A fuel as defined in claim 8, wherein in the said imide compound X is a carbonyl group.

16. A fuel as defined in claim 8, wherein in the said amide compound X is a sulfonyl group, and R is a phenyl radical.

17. A fuel as defined in claim 8, wherein said imide is N-thiotrichloromethyl tetrahydrophthalimide.

18. A fuel as defined in claim 8, wherein said amide is N-thiotrichloromethyl N-butyl benzene sulfonamide.

19. A fuel as defined by claim 8 wherein the said nitro alcohol is a nitro-propanediol having a nitro group and a methylol group attached to the same carbon atom.

20. An aviation turbojet fuel having incorporated therein from about 5 to 25 parts per million of a compound selected from the class consisting of (a) a N-thiotrichlorophthalimide and (b) a N-thiotrichloromethyl benzene sulfonamide, and from about 50 to 1000 parts per million of a nitropropanediol having a nitro group and a methylol group attached to the same carbon atom.

References Cited in the file of this patent

UNITED STATES PATENTS 2,680,058   Harris et al. _____ June 1, 1954